United States Patent [19]

Codispoti et al.

[11] 4,388,261
[45] Jun. 14, 1983

[54] METHOD FOR FORMING A COMPARTMENTED PUNCTURE SEALANT PACKAGE BY CO-EXTRUSION

[75] Inventors: Thomas E. Codispoti, Akron; James M. Giustino, Uniontown; Richard M. Griffith, Akron, all of Ohio; James T. Tsai, Fremont, Calif.

[73] Assignee: The General Tire & Rubber Company, Akron, Ohio

[21] Appl. No.: 307,401

[22] Filed: Oct. 1, 1981

[51] Int. Cl.³ .................. B29D 7/04; B29H 3/00
[52] U.S. Cl. .................... 264/171; 152/346; 152/347; 156/115; 264/177 R; 425/131.1; 425/133.5; 425/462
[58] Field of Search .......... 264/171, 173, 209.8, 264/514, 45.9, 177 R, 45.5, 45.6, 46.1, 524–525; 425/131.1, 133.1, 133.5, 817 C, 4 C, 462; 156/115; 152/346–347

[56] References Cited

U.S. PATENT DOCUMENTS

| | | | |
|---|---|---|---|
| 1,959,460 | 5/1934 | Crossan | 152/347 |
| 2,161,490 | 6/1939 | Waber | 156/115 |
| 2,736,921 | 3/1956 | Mulbarger et al. | 264/171 |
| 2,748,401 | 6/1956 | Winstead | 264/209.8 |
| 2,877,819 | 3/1959 | Gibbs | 152/347 |
| 3,229,005 | 1/1966 | Reifenhauser | 264/46.1 |
| 3,270,393 | 9/1966 | Levenson | 264/46.1 |
| 3,479,425 | 11/1969 | Lefevre et al. | 264/171 |
| 3,557,265 | 1/1971 | Chisholm et al. | 264/171 |
| 3,645,837 | 2/1972 | Chisholm et al. | 264/46.1 |
| 3,668,288 | 6/1972 | Takahashi | 264/46.1 |
| 3,825,641 | 7/1974 | Barnett | 264/209.8 |
| 3,855,376 | 12/1974 | Ono et al. | 264/46.1 |
| 3,903,947 | 9/1975 | Emerson | 152/347 |
| 3,924,990 | 12/1975 | Schrenk | 425/131.1 |
| 4,171,237 | 10/1979 | Böhm et al. | 156/115 |
| 4,206,796 | 6/1980 | Chemizard | 152/347 |
| 4,359,354 | 11/1982 | Böhm | 264/173 |

FOREIGN PATENT DOCUMENTS

| | | | |
|---|---|---|---|
| 872880 | 6/1971 | Canada | 264/45.9 |
| 2166631 | 12/1974 | Fed. Rep. of Germany | 425/133.1 |

Primary Examiner—Jeffery R. Thurlow

[57] ABSTRACT

A puncture sealant package for incorporation into a pneumatic tire is formed by coextruding a puncture sealant, and a skin forming material. The ribs are formed in an initially circular package profile as chords. After flow in a sheet die, the chords form divider ribs making small angles with the encapulating skin. The compartments formed by the ribs prevent flow of the sealant toward the center of a tire.

7 Claims, 6 Drawing Figures

METHOD FOR FORMING A COMPARTMENTED PUNCTURE SEALANT PACKAGE BY CO-EXTRUSION

The invention relates to a method and apparatus for forming a puncture sealant package to be incorporated into a tire. A flowable puncture sealant is encapsulated into an envelope. The envelope containing the puncture sealant is then used to form the portion of an innerliner inside of the tread portion of a tire.

Puncture sealant incorporated in an envelope which does not absorb plasticizing oils from the puncture sealant allows one to stabilize the physical properties of a puncture sealant in a tire. A puncture sealant encapsulated in an incompatible envelope as an innerliner, is known from U.S. Pat. No. 3,903,947 Emerson 1975. U.S. Pat. No. 4,171,237 Bohm 1979, suggests laminating specifically designed rubber compounds using a co-extrusion method to form a puncture sealant composite. The concept of forming membranes in the puncture sealant package is known from U.S. Pat. No. 4,206,796 Chemizard 1980.

The Chemizard patent however does not teach a fast and accurate method of making the compartmented sealing package or a method for preventing air bubbles from being trapped in the package. Also the angles formed by the partitions with the encapsulated walls appear to vary from about 45° to 90°. This is undesirable because as will be shown later, a puncturing object near a wall will not have a sufficient reservoir of puncture sealant from which to draw.

Air bubbles in the package are detrimental in that it may be possible for a nail to hit an air bubble on its passage through the sealant, thus preventing the sealant from adhering to the nail and being drawn into the puncture when the nail is withdrawn.

Various extrusion methods are known for forming laminated films. See for example, U.S. Pat. No. 3,479,425 Lefevre 1969 and U.S. Pat. No. 3,557,265 Chisholm 1971. These extrusion patents also disclose using forming dies in the manufacture of laminated films. They do not however remotely suggest forming a puncture sealant package for a tire or the idea of employing co-extrusion to form membranes separating compartments in the extruded package.

The invention as claimed is intended to provide a remedy for all of the above-recited deficiencies of the prior art. The present invention provides a co-extrusion method which encapsulates sealant and forms membranes through the package providing compartments. The co-extrusion method prevents the incorporation of air or other gas bubbles into the sealant in the package and generates membranes which form compartments in the sealant package.

The preferred way of carrying out the invention is described in detail below with reference to drawings, in which.

Figure 4:
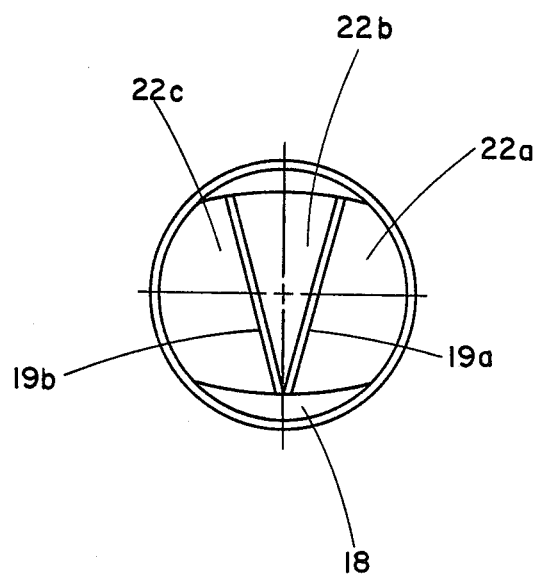

FIG. 4 is a cross-sectional view of the extrudent as it leaves the feed block having sealant 22 encapsulated by skin 18 and separated into components by membranes 19.

Figure 5:
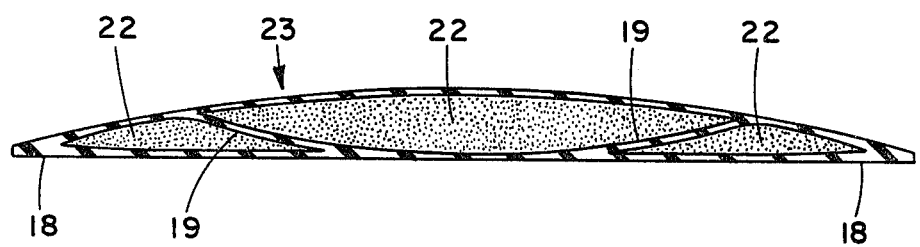

FIG. 5 is a cross-sectional view of the packaged sealant of FIG. 4 after it has been flattened by sheet die 14.

Figure 6:
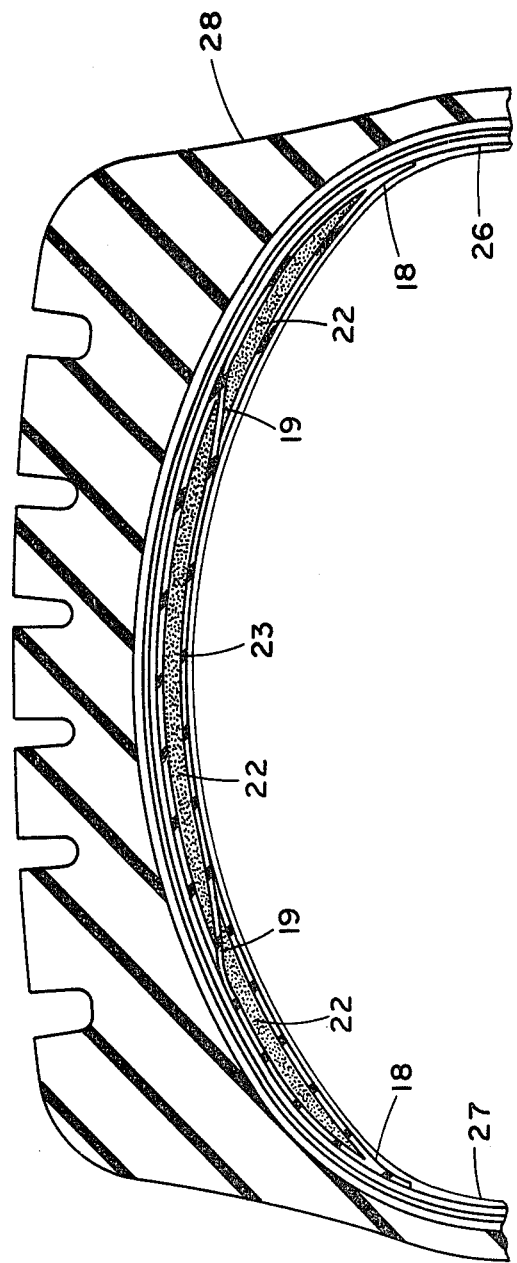

FIG. 6 is a cross-sectional view of a punctue sealant assembly showing the location of the assembly 23 and the cord "strike-through" barrier compound 26 in a steel-belted radial tire 28.

The figures show an extruding apparatus designed to produce a sealant package to be used in a tire to seal punctures. The package is shown in FIG. 5 and comprises a sealant 22 which is encapsulated in a skin 18. The sealant is flowable and is incompatible with skin 18 and membranes 19a and 19b. The reason for this is that it is necessary that the sealant not adhere to the skin when ruptured because it is necessary that the sealant adhere to the rupturing or penetrating body. This adhesion to the penetrant causes sealant to be drawn from areas surrounding the penetration as the penetrant passes through the sealant. When the penetrant is removed the sealant which adhered to it is drawn into the opening carried by the removal of the penetrant, and seals the opening. It is also necessary that the plasticizer and other materials which give flow characters to the sealant not be absorbed by the skin 18 or the membranes 19a and 19b, as it is necessary that the sealant of the present invention remain in a flowable condition during the lifetime of the tire.

The formulations of an ethylene propylene diene monomer (EPDM) based sealant and a nitrile rubber (NBR) membrane incompatible with the EPDM are set forth in Tables Ia and Ib.

TABLE Ia

BASIC DESCRIPTION OF SEALANT

| Sealant | Parts |
| --- | --- |
| EPDM rubber[a] | 100 |
| Paraffinic oil[b] | 120 |
| Clay | 15 |
| Zinc Oxide | 5 |
| Diphenyl amine-acetone reaction product[c] | 2 |

[a]Nordel 1070
[b]Sunpar 2280
[c]BLE 25

TABLE Ib

BASIC DESCRIPTION OF MIGRATION LAYER (SKIN)

| Nitrile Envelope | Parts |
| --- | --- |
| Nitrile rubber[d] | 100 |
| Carbon black (HAF)[e] | 35 |
| Carbon black (AUSTIN)[f] | 20 |
| Dioctyl phthalate | 22.5 |
| Phenolic resin[g] | 10 |
| Brominated, phenolic resin[h] | 5 |
| Processing aid supplied by Technical Processing, Inc. and used as a release agent[i] | 2 |
| Zinc Oxide | 5 |
| Stearic Acid | 2 |
| Diphenyl amine-acetone reaction product[j] | 2 |
| Tetramethyl thiuram monosulfide[k] | 0.1 |
| N—t butyl 2 benzothiazole sulfenamide[l] | 2 |
| Oil-treated insoluble sulfur (80% active)[m] | 1.2 |

Figure 1:
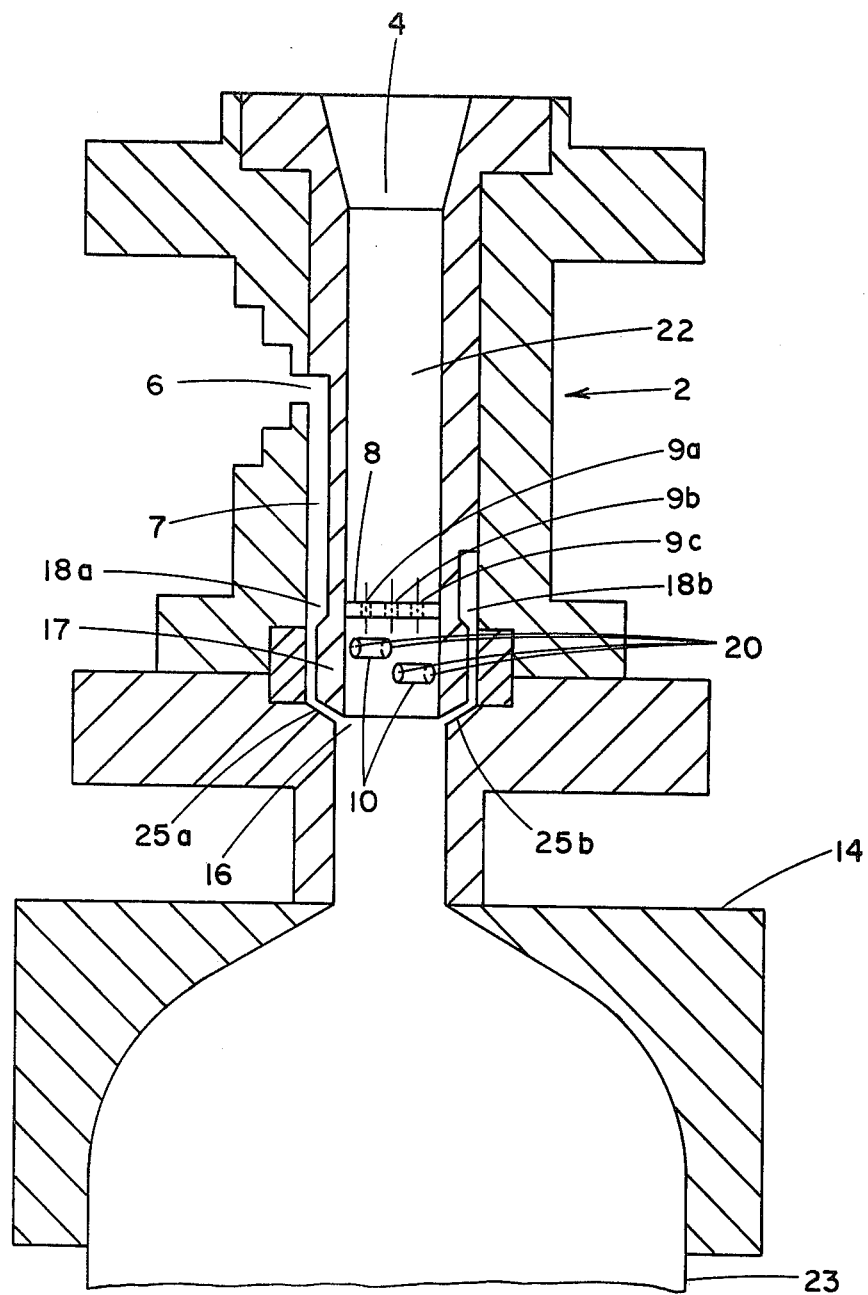
FIG. 1 is a top view of a midplane section parallel to the feed block and sheet die.
Figure 2:
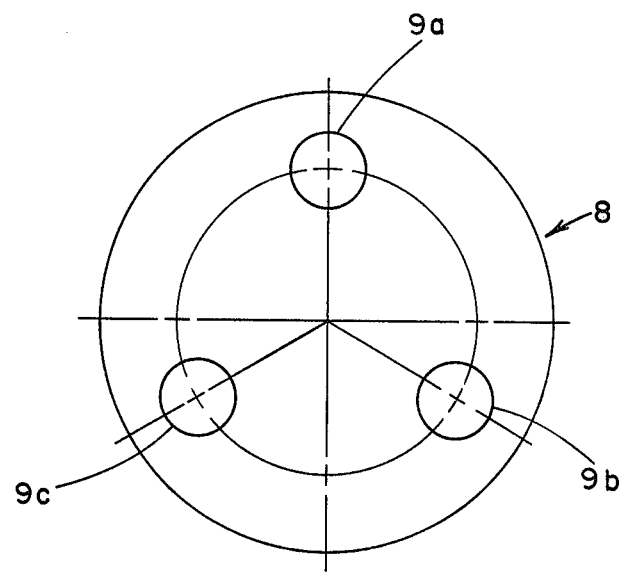
FIG. 2 shows an orifice plate which is positioned upstream of the membrane forming tubes for flow balance of sealant.
Figure 3:
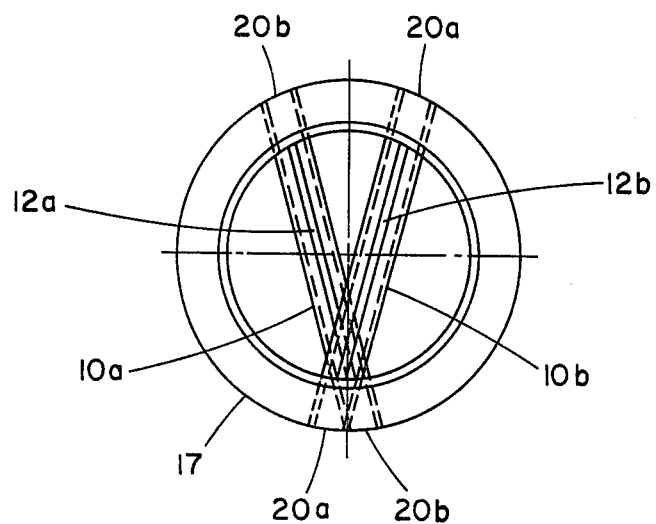
FIG. 3 is a view of the block mandrel end piece looking upstream from the die.

[d]Hycar 1092-30
[e]HAF Black
[f]Austin Black
[g]SP25 Tackifier (Schenectady Chemicals)
[h]SP1055
[i]TE-28-G9
[j]BLE 25
[k]Monex (TMTM)
[l]Santocure NS (TM)
[m]Crystex The sealant ingredients and the skin and membrane ingredients were milled separately. A co-extrusion line to make a sealant element 23 for a tire was set up using a 2-inch extruder (not shown) to process the sealant core 22 and a 1-inch extruder (not shown) to process the skin and membrane rubber 18, 19a and 19b. Referring now to FIGS. 1, 2 and 3, the sealant from the 2-inch extruder was fed into inlet 4 of feed block 2. The skin and membrane rubber 18, 19a and 19b was fed into inlet 6. The stream of sealant passing into inlet 4 of feed block 2 is separated into three separate streams by three holes 9a, 9b and 9c in orifice plate 8 (see FIG. 2) positioned upstream of membrane forming tube slits 12a and 12b. Each of the three streams formed by orifice plate 8 are separated by membranes 19a and 19b (see FIG. 3) formed at slits 12a, 12b (see FIG. 2) and surrounded by skin 18 extruded past the feed block mandrel end piece 17 from orifice 25 onto the sealant 22 in the feed block at 16. Inlet 6 is in direct communication with skin forming outlet 25. The membrane forming mechanism was formed by inserting two tubes, 10a and 10b through channel 4 of feed block 2. The openings 20a and 20b of the tubes 10a and 10b were open to and fed from the skin canal 7. Openings 20a and 20b in tubes 10a and 10b are shown in FIGS. 1 and 3. Fine slits 12a and 12b cut into each tube 10a and 10b along their lengths lets rubber out as membranes into the sealant stream. The tubes have a length of 0.675 inches (1.71 cm) and a diameter of 0.080 inches (0.203 cm). See FIG. 3 for a cross-sectional view of the feed block mandrel end piece showing the membrane forming slit tubes. The orifice plate 8 was positioned upstream of the slit tubes to control the flow rates of sealant streams through the passages formed by the tubes 10a and 10b. The internal diameter of the orifices were 9/23 inches (1.0 cm), 12/23 inches (1.3 cm) and 9/23 inches (1.0 cm). The larger orifice 9a fed the center compartment and the smaller orifices 9b and 9c fed the side compartments formed by membranes 19a and 19b extruded from the slit tubes. The function of the orifice plate 8 was to properly balance the three final streams of sealant 22. The two tubes 10a and 10b were located different distances from the orifice plate so that each could be at any angle to the skin forming orifice.

After formation of the sealant 22 separated by membranes 19 and encapsulated by skin 18, the combined streams flow through sheet die 14 where the assembly is changed from a rod to a sheet shape. Extrusion temperature ranged from 160° F. (71.1° C.) to 200° F. (93.3° C.) with the nitrile rubber stock temperature preferably 20° F. (11.1° C.) higher than the sealant temperature giving optimum sealant results.

Because of orifice plate 8, the ratio of the three final sealant streams tended to be more consistent regardless of extruder speed.

The puncture sealant package 23 had a width of 6.5 inches (16.6 cm). Each compartment has a width including the skin of about 2.3 inches (5.8 cm). The package was about 0.11 inches thick (0.28 cm).

A radial tire 28 was built in a conventional manner positioning the sealant package 23 between the innerliner 27 and the cord "strike through" barrier compound 26. See FIG. 6 for a cross-sectional view of the tire.

In order to prevent the radial cords from pulling into the puncture sealant package in the building of the tire, a cord strike through barrier 26 was placed between the sealant package and the adjacent body ply. The formulation of the cord barrier compound is set forth in Table II.

TABLE II

FORMULATION OF CORD BARRIER COMPOUND

| | Parts |
| --- | --- |
| Natural Rubber | 96.54 |
| Styrene butadiene rubber | 3.46 |
| Wood cellulose fibers (290 microns long by 18 microns diameter)[n] | 18.00 |
| Wood cellulose fibers (55 microns long by 9 microns diameter)[o] | 17.40 |
| Carbon black[p] | 50.00 |
| Styrenated Phenol Antoxidant[q] | 1.00 |
| Naphthenic Oil Type 103[r] | 11.00 |
| Zinc Oxide | 3.00 |
| Stearic Acid | 1.00 |
| Octylphenol formaldehyde resin[s] | 2.00 |
| 2, 2-benzothiazldisulfide[t] | 1.00 |
| Tetra methylthiuram monosulfide[u] | 0.10 |
| Oil-treated insoluble sulfur (80% active)[v] | 3.00 |

[n]Solka-Floc KS-1016 (Harwick Chemical)
[o]Solka-Floc BW-100 (Harwick Chemical)
[p]ISAF Black
[q]Wingstay S (Goodyear)
[r]Circosol 42XH (Sun Petroleum)
[s]Arofene 8318
[t]MBTS (Am. Cyanamide)
[v]Crystex Because the sealant assembly plus cord barrier compound represent added gauge (0.190"=4.8 mm), the cure cycle of the tire had to be extended in order to allow more time for heat to transfer from the curing bladder to the area under the tread and belts.

Testing in use of tires produced by the present invention established that sealant remained in place. Other sealant packages without partitions were made and tested and the sealant did not remain in place. Sealant was somehow moved toward the center. It is believed that flexing of the tread as it passed through the footprint somehow resulted in a pumping action. In any event, the membranes prevented the migration of the sealant across the inside of the tread area of the tire. The membranes also adequately provided for puncturing objects to be coated with sealant and the sealant be pulled with the puncturing object into the hole formed in the tire.

Any number of membranes can be incorporated into a sealant package depending of course on sealant migration problems encountered.

In addition, various sealants and packaging materials can be used as is shown in the prior art referred to earlier.

In testing the sealant package of the present invention it was found, using layers of different colored sealant, that when a nail punctured a tire the sealant broke loose from the elastomer layer next to the tire, adhered to the nail and was drawn by the nail from a large area of the package. When the nail was withdrawn, the sealant broke loose from the inner elastomer layer adhered to the nail and was again drawn from a large area of the package. As the nail left the hole, the sealant accumulated and was drawn into the hole.

We claim:

1. A method of forming a compartmented package containing puncture sealant for use in a tire, the steps of the method comprising
    (a) providing a first stream of uniform cross-section of a puncture sealant.
    (b) providing a second stream of a package forming material;

(c) encapsulating the puncture sealant stream within the package forming material;
(d) forming continuous ribs of the package forming material through the puncture sealant surrounded by package forming material;
(e) supplying the compartmented stream of the puncture sealant to an extrusion die defining an elongate slot like orifice; and
(f) forming and expanding the composite stream into a generally elongate configuration with ribs extending from package wall to package wall each rib forming a juncture angle of from 1° to 90° with a package wall.

2. The method of claim 1 wherein two ribs are formed.

3. The method of claim 2 wherein end compartments, separated from a center compartment by the two ribs, of approximately equal size and shape are formed.

4. The method of claim 1 wherein the packaging material and the puncture sealant are incompatible.

5. The method of claim 1 wherein the elongate slot like orifice is thinner at the edges than at its center.

6. The method of claim 1 wherein each rib forms an angle with the package wall of from 1° to 25°.

7. An apparatus for forming a compartmented package comprising:
(a) a means for providing a first stream of uniform cross-section of a puncture sealant and a second stream of a package forming material.
(b) a means for encapsulating the puncture sealant stream within the package forming material;
(c) a means for forming non-parallel continuous ribs of the package forming material through the puncture sealant surrounded by package forming material;
(d) a means for supplying the compartmented stream of the puncture sealant to an extrusion die defining an elongate slot like orifice; and
(e) a means for forming and expanding the composite stream into a generally elongate configuration with ribs extending from package wall to package wall each rib forming a juncture angle of from 1° to 25° with a package wall.

* * * * *